United States Patent
Yoshida et al.

(10) Patent No.: US 7,287,572 B2
(45) Date of Patent: Oct. 30, 2007

(54) METHOD FOR DIE CASTING AN ALUMINUM BASE FRAME USED IN A TRANSMISSION DEVICE

(75) Inventors: Osamu Yoshida, Osaka (JP); Kozo Inoue, Osaka (JP)

(73) Assignee: Tsubakimoto Chain Co., Osaka-fu (JP)

( * ) Notice: Subject to any disclaimer, the term of this patent is extended or adjusted under 35 U.S.C. 154(b) by 0 days.

(21) Appl. No.: 11/370,763

(22) Filed: Mar. 8, 2006

(65) Prior Publication Data

US 2006/0266493 A1  Nov. 30, 2006

(30) Foreign Application Priority Data

May 24, 2005 (JP) .............................. 2005-150914

(51) Int. Cl.
*B22D 13/00* (2006.01)

(52) U.S. Cl. .................... 164/113; 164/112; 164/312

(58) Field of Classification Search ................ 164/339, 164/137, 112, 113, 312
See application file for complete search history.

(56) References Cited

U.S. PATENT DOCUMENTS 3,608,623 A * 9/1971 Woltering ................... 164/339
5,222,917 A   6/1993 Shimaya et al.
6,086,498 A   7/2000 Hashimoto
6,588,490 B2 * 7/2003 Rommel et al. ............ 164/369

FOREIGN PATENT DOCUMENTS

| DE | 10346642 | 10/2003 |
| DE | 10333077 A1 | 2/2005 |
| GB | 2 382 637 A | 6/2003 |
| GB | 2 394 267 A | 4/2004 |
| JP | 8-117958 | 5/1996 |
| JP | 2540899 | 4/1997 |
| JP | 9271895 | 10/1997 |
| JP | 11019761 | 1/1999 |
| JP | 2000266143 | 9/2000 |
| JP | 2001-153195 | 6/2001 |

OTHER PUBLICATIONS

U.S. Appl. No. 11/481,361, Yugi Kurematsu et al.

* cited by examiner

*Primary Examiner*—Len Tran
(74) *Attorney, Agent, or Firm*—Howson & Howson LLP

(57) ABSTRACT

A cast aluminum base frame of a movable guide for a timing chain in an internal combustion engine is produced by a die in which the parting lines are located so that the shoe-engaging surface of the base frame and the pivot shaft-receiving hole are each formed by a continuous surface of the die, without oppositely pitched drafts.

2 Claims, 6 Drawing Sheets

METHOD FOR DIE CASTING AN ALUMINUM BASE FRAME USED IN A TRANSMISSION DEVICE

CROSS REFERENCE TO RELATED APPLICATIONS

This application claims priority on the basis of Japanese patent application 2005-150914, filed May 24, 2005. The disclosure of Japanese application 2005-150914 is hereby incorporated by reference.

FIELD OF THE INVENTION

The invention relates to improvements in the production of a die cast base for a sliding contact guide of the kind used in an internal combustion engine to prevent vibration of, or to control tension in, a timing chain.

BACKGROUND OF THE INVENTION

An automobile engine generally includes a timing transmission which utilizes an endless, traveling, flexible, transmission medium such as a roller chain, silent chain, toothed belt, or the like, to transmit rotation from the engine crankshaft to one or more camshafts. In such a transmission, sliding contact guides are used to guide the transmission medium. Typically, a fixed guide is disposed in sliding engagement with the tension side of a transmission chain, i.e., the side moving from a driven sprocket to the driving sprocket, and a movable guide is disposed in sliding engagement with the slack side of the chain, i.e., the side moving from the driving sprocket to a driven sprocket. The guides control the path of the chain to prevent vibration, both in the plane of the chain and in directions transverse to the plane of movement of the chain.

A sliding contact guide typically comprises a chain-contacting shoe composed of a synthetic resin mounted on a support, sometimes referred to as a "base frame." In the case of a movable guide, the supporting base typically has a mounting hole fitting onto a shaft extending from the engine block, and is pivotable about the shaft. The movable guide cooperates with a tensioner to maintain appropriate tension in the chain. A conventional transmission of the kind described above is depicted and explained in detail in the U.S. Pat. No. 6,086,498, granted Jul. 11. 2000.

The supporting base is typically a die cast aluminum member having an I-shaped cross-section for strength, rigidity and light weight. Because the transmission medium can exert forces on the shoe in various directions, the base frame must be rigidly attached to the shoe in order to provide proper support. The base frame is manufactured by die casting aluminum (which, as used herein, includes aluminum alloys).

In aluminum casting, forming interior surfaces of a die with a slight angle or draft is usually necessary in order to make it possible to remove the casting from the die. In manufacturing a conventional base frame for a chain guide, two separable die parts are brought together to form a cavity. As shown in FIG. 7, the guide 500 comprises a cast aluminum base frame 520 and a resin shoe 510 mountable on the front surface 521 of the base frame. The base frame has a generally I-shaped cross-section, throughout most of its lengths, with short reinforcing ribs extending from the front flange to the back flange of the base frame on both sides of the web of the base frame. A boss, formed adjacent one end of the base frame, has a mounting hole 522 for receiving a shaft on which the guide can be pivoted.

As shown in FIG. 7, each of two opposed die parts P1 and P2 forms one-half of an I-shaped cavity conforming to the I-shaped cross-section of the base frame. The die parts meet at location a parting line PL, which intersects the central parts of the front and back surfaces of the base frame 520 formed by the die. Consequently, it is necessary to form two oppositely sloped drafts in the respective die parts P1 and P2, meeting at a peak 521 on the front surface of the base frame. A similar pair of oppositely sloped drafts is formed on the die parts where they form the back surface of the base frame. The oppositely sloped drafts allow the die parts to be separated easily for release of the casting. However, following the casting step, since the front surface of the base frame has a peak, it must be machined in order to ensure a close fit between the resin shoe and the base frame. Especially since the front surface of the base frame is curved in its longitudinal direction, machining of the front surface is time-consuming and difficult, and increases the cost of manufacture.

AS shown in FIG. 8, conventional die casting also produces a double taper in the mounting hole formed in boss 522. Each of the die parts P1 and P2 is formed with an annular cavity surrounding a central protrusion. The protrusions meet at a parting line PL that intersects the middle of the mounting hole in boss 522. The protrusions of the die parts are oppositely tapered as seen in FIG. 8, to provide drafts allowing the die parts P1 and P2 to be separated from each other for removal of the casting. A doubly tapered mounting hole will inevitably allow yaw and rolling motion of the guide when in use, resulting in rapid wear and reduced control of vibration in the transmission chain that slides on the guide. Consequently a costly, separate, precision machining step is required to straighten the interior wall of the mounting hole.

In addition, especially in the case where the boss portion of the guide base is comparatively long, torsion is liable to occur during the casting process the wall of the boss must be formed initially with a thickness sufficient to allow a straight hole to be formed in the subsequent machining step. The requirement for increased thickness can result in the production of voids or "blow holes" in the casting process. These voids can impair the strength and endurance of the guide, and result in failure due to the formation of cracks.

In the conventional casting process, the die parts are separated only after the aluminum casting has completely cooled. Thermal shrinkage during the cooling process can lead to the application of excessive loads to the die parts as they are separated, and shorten the useful life of the die.

The principal objects of this invention include one or more of the following: avoidance of the above-mentioned problems encountered in conventional methods of die casting; obviating, or at least reducing the cost of, machining steps carried out following die casting; provision of a guide base that pivots smoothly on a mounting shaft; provision of an easily manufactured guide base on which a shoe can be supported without wobbling; reduction of production costs and weight of the base frame; and increasing the life of the mold. Other objects and advantages of the invention will be apparent to persons skilled in the art in the light of the following description, when read in conjunction with the drawings.

SUMMARY OF THE INVENTION

The aluminum base frame is produced by bringing together first and second die parts to form a die cavity, pouring molten aluminum into the die cavity, thereby casting the aluminum base frame, and removing the die parts from the aluminum base frame.

An elongated shoe-supporting part of the base frame is formed in accordance with a first aspect of the invention. The first die part is an elongated part having a continuous face against which a front surface of the aluminum base frame is formed. The continuous face of the first die part is substantially straight in cross-section planes to which the direction of elongation of the die part is perpendicular, thereby avoiding the formation of oppositely pitched drafts on the front surface of the base frame.

Preferably, the die cavity has a corner along which a longitudinal side edge of the front surface of the base frame is formed. The corner of the die cavity extends along the direction of elongation of the die parts, and, when the die parts are brought together, the corner of the cavity coincides with an edge of an interface at which the die parts meet.

In a preferred method, the die cavity has a first corner along which a side edge of the front surface of the base frame is formed, and a second corner along which a side edge of the back surface of the base frame is formed. Both of the first and second corners extend along the direction of elongation of the die parts and are diagonally opposite each other. When the die parts are brought together, each of the first and second corners coincides with an edge of an interface at which the die parts meet.

In accordance with another aspect of the invention, the die parts can be removed from the aluminum base frame when the aluminum base frame is in a semi-solidified state, and complete solidification of the molten aluminum occurs after the die parts are removed.

In accordance with still another aspect of the invention, the base frame preferably has a pivot hole having an interior wall, in the form of a surface of revolution, for receiving a shaft on which the base frame can be pivoted. In accordance with still another aspect of the invention, at least one of the die parts includes a protruding portion having a continuous outer surface in the form of a surface of revolution, on which the interior wall of the pivot hole is formed, and a tip. For any two stations along the length of the protruding portion, the diameter of the station closest to the tip is no greater than the diameter of the other of the two stations. Consequently the interior wall of the pivot hole can be formed without oppositely pitched drafts.

When the parting line of the die meets a side edge of the front surface of the casting, oppositely sloping drafts on the front surface of the casting are avoided, and machining of the front surface of the casting is not needed in order to enable the shoe to be mounted on the base frame. The cost of production of the guide is reduced, and a light weight, and high strength base frame can be produced.

When the parting lines of the die on the front and back sides of the die cavity are diagonally opposite each other, larger portions of the cast base frame are exposed when the die parts are separated. Consequently, it is easier to remove the casting from the die. Moreover, when the die parts are constructed so that the parting lines are diagonally opposite each other, the die parts can be separated without the application of excessive loads, and the useful life of the mold is increased.

When the interior wall of the pivot hole is cast without oppositely pitched drafts, there is no need for high precision machining of the pivot hole following die casting. Moreover, a reduction in the weight and smooth pivoting action can be achieved without reducing the strength of the guide.

When the die parts are separated while the casting in a semi-solidified state, thermal shrinkage can be avoided, and smooth opening of the mold can be carried out even when the front and back surfaces of the base frame, and the pivot hole, have zero draft. Separation of the die parts while the casting is still in a semi-solidified state also contributes to the avoidance of excessive loads on the die parts.

DETAILED DESCRIPTION OF THE PREFERRED EMBODIMENTS

Figure 1:
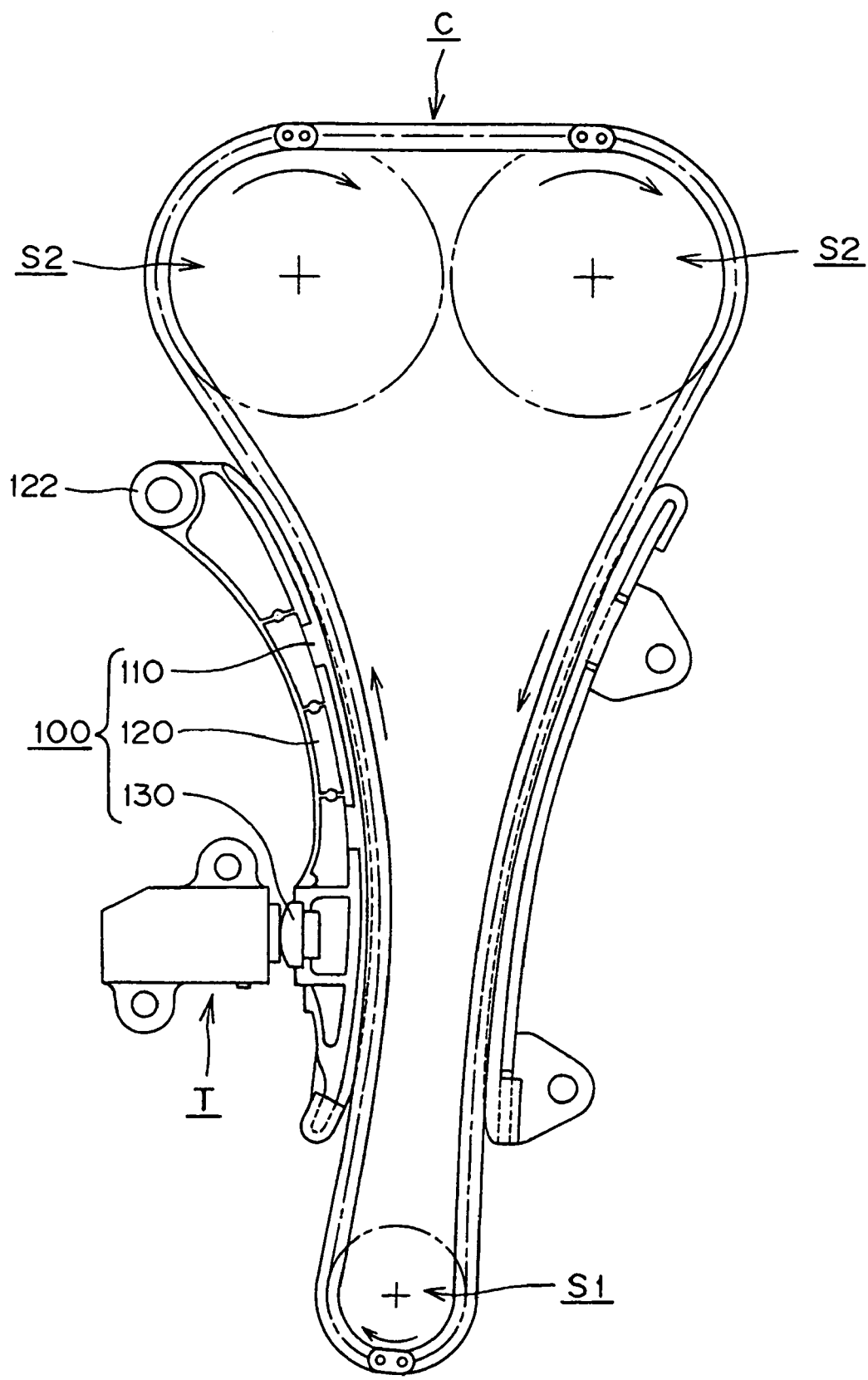
FIG. 1 is schematic elevational view of the timing transmission of a dual overhead cam internal combustion engine equipped with a movable sliding contact guide in accordance with the invention.

FIG. 1 shows a movable guide 100 in sliding engagement with a timing chain C, arranged to be driven by a crankshaft sprocket S1, and to drive two camshaft sprockets S2. The guide cooperates with a tensioner T, the plunger of which presses against a resin pad 130 on the guide, and maintains tension in the chain.

Figure 2:
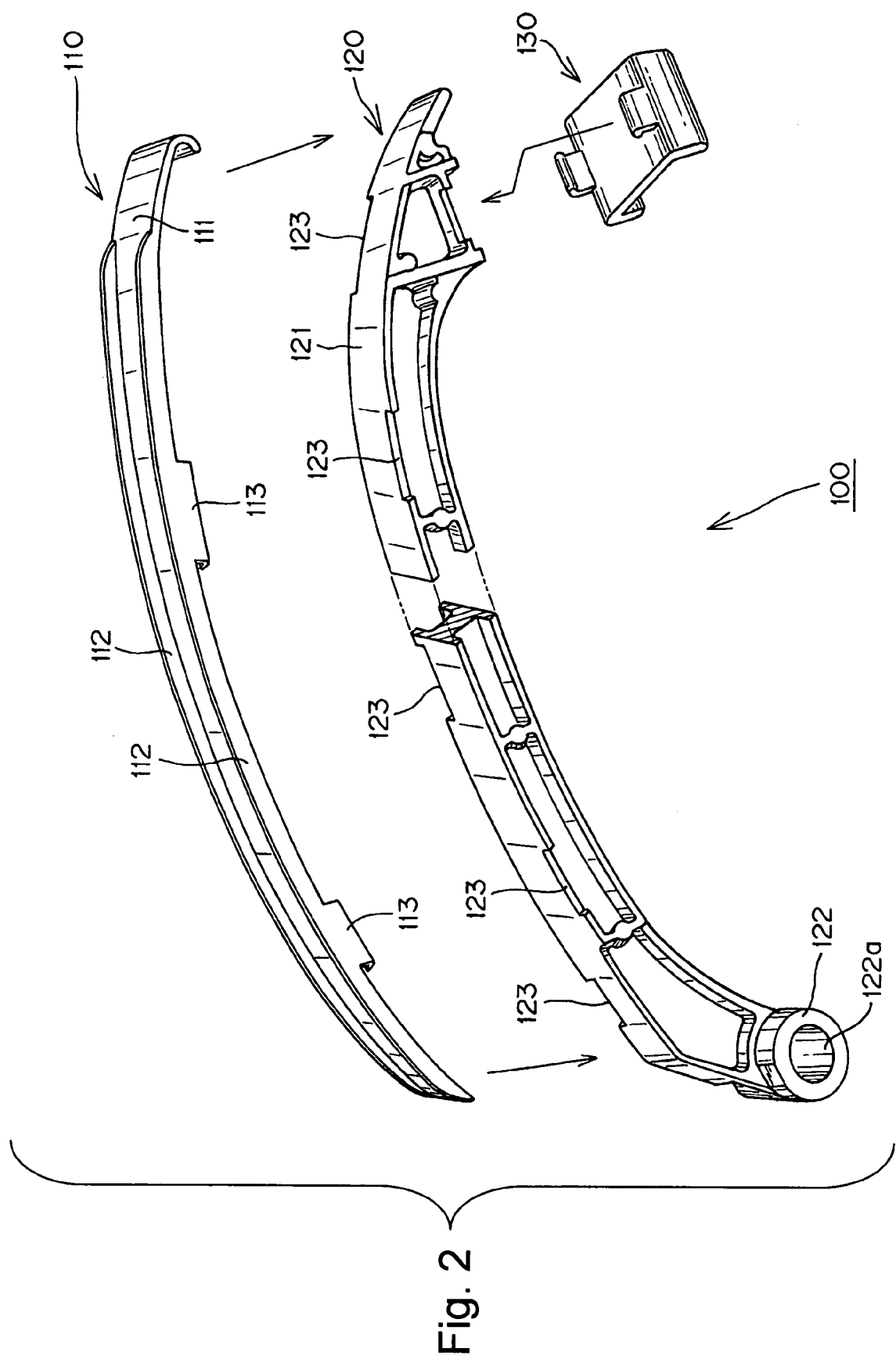
FIG. 2 is an exploded perspective view of the sliding contact guide, partially broken away to show the cross-sectional shape of the base frame.
Figure 3:
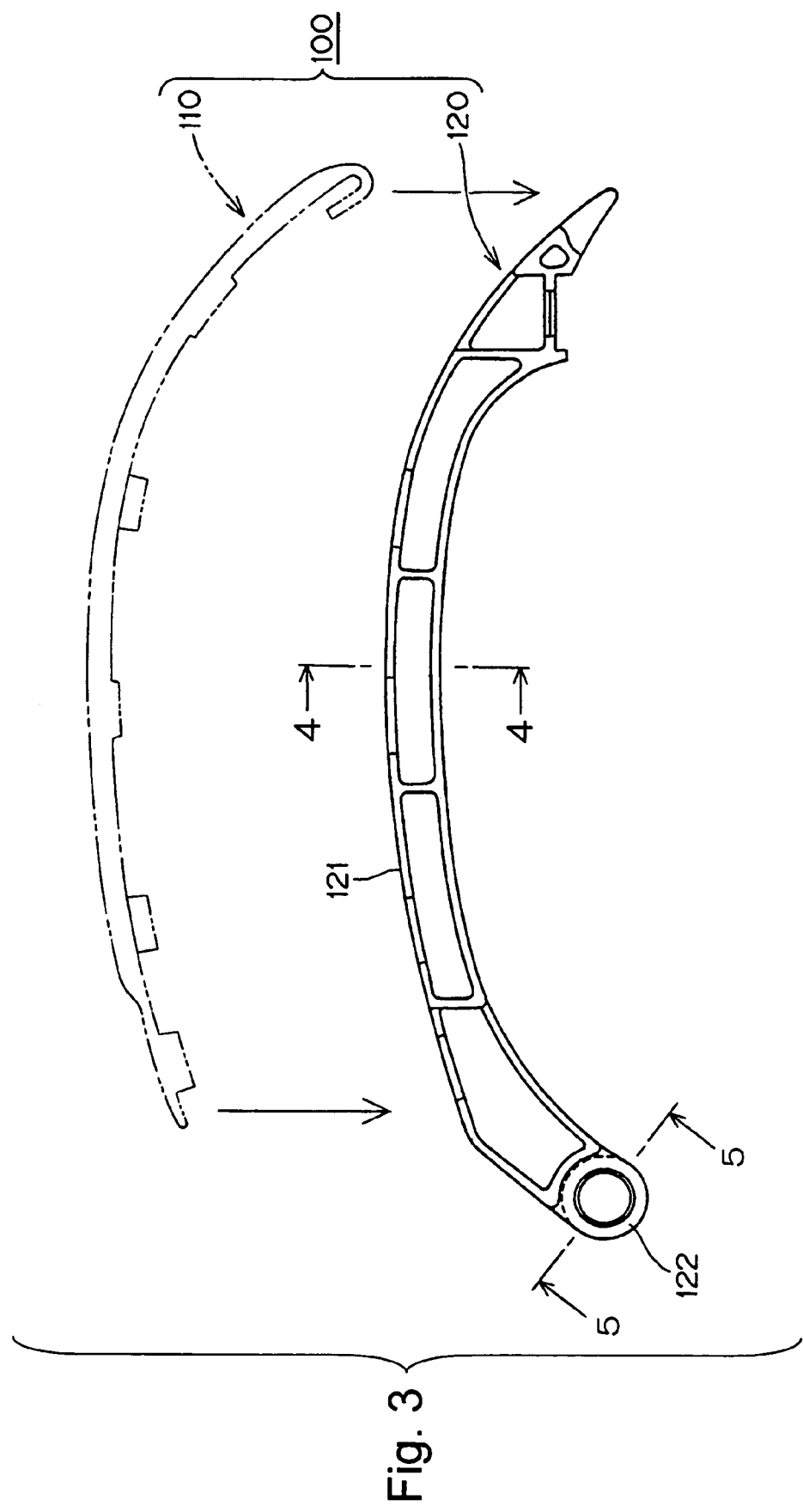
FIG. 3 is an exploded side elevational view of the base frame and a shoe.

As shown in FIGS. 1 and 2, the guide 100 comprises an elongated resin shoe 110, which has a longitudinally elongated, substantially arc-shaped, sliding contact surface 111 on which the chain slides. Side walls 112 on the shoe are provided as guards to prevents snaking travel of the timing chain.

The base frame has an I-shaped cross-section, and the shoe 110 is supported on a longitudinally elongated front surface 121 of a front flange of base frame 120. Hooks 113, formed as unitary parts of the shoe, fit into notches 123 on the front flange of the base frame, locking the shoe to the base frame.

The guide can be pivotably mounted on a shaft fixed to an engine block and extending through a pivot hole 122a formed in a boss 122 adjacent one end of the base frame.

Figure 4:
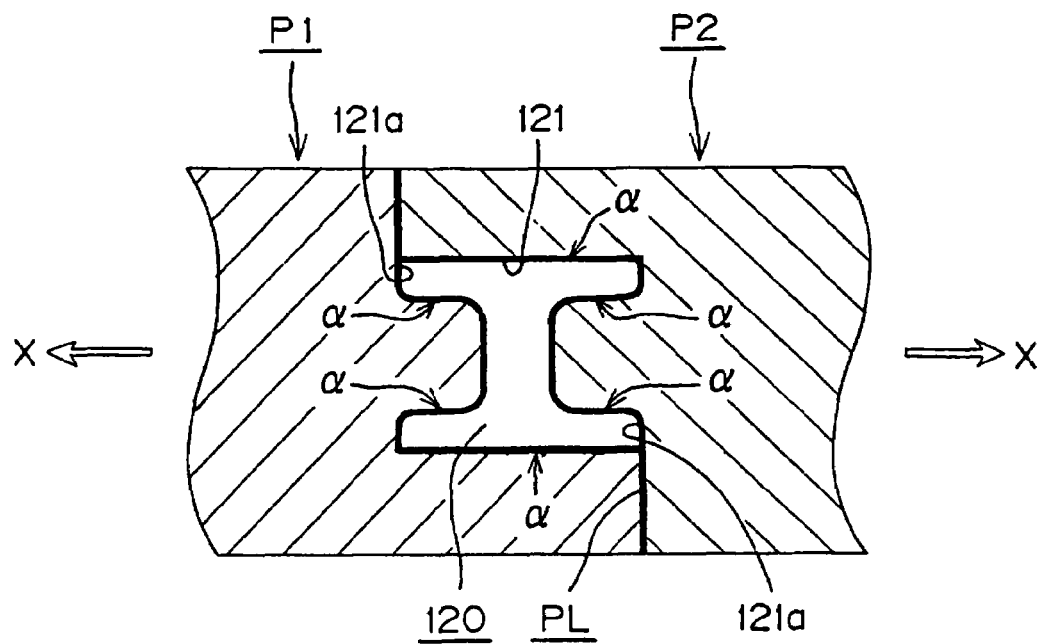
FIG. 4 is a cross-sectional view of the guide of FIG. 3, shown in the die in which it is cast, the section being taken on section plane 4-4 in FIG. 3.
Figure 5:
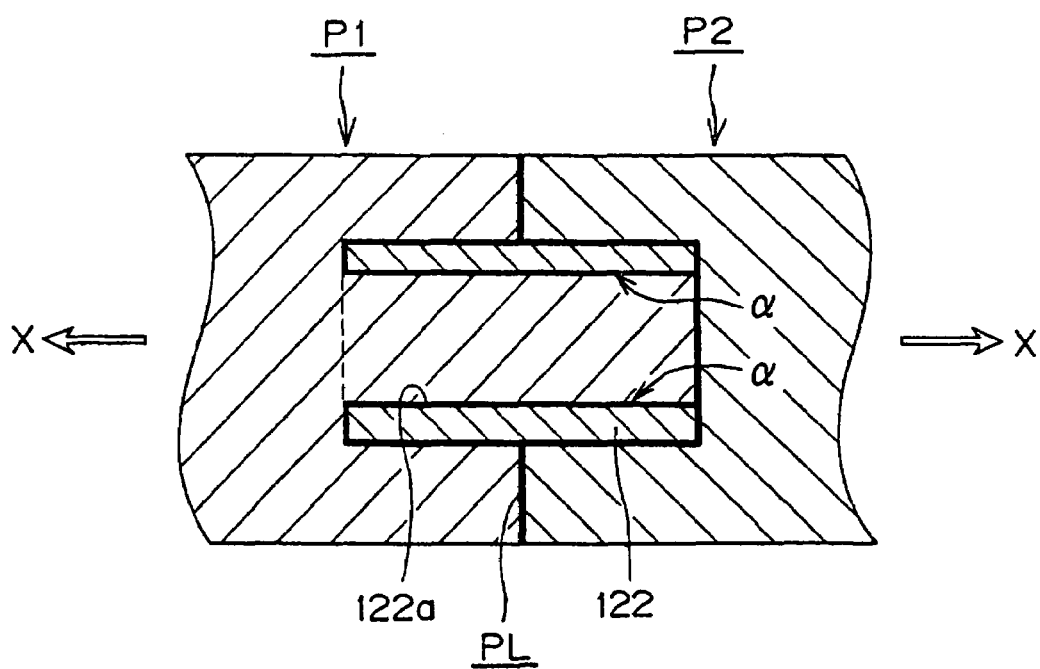
FIG. 5 is a cross-sectional view of the guide of FIG. 3 shown in the die in which it is cast, the section being taken along on section plane 5-5 in FIG. 3.
Figure 6:
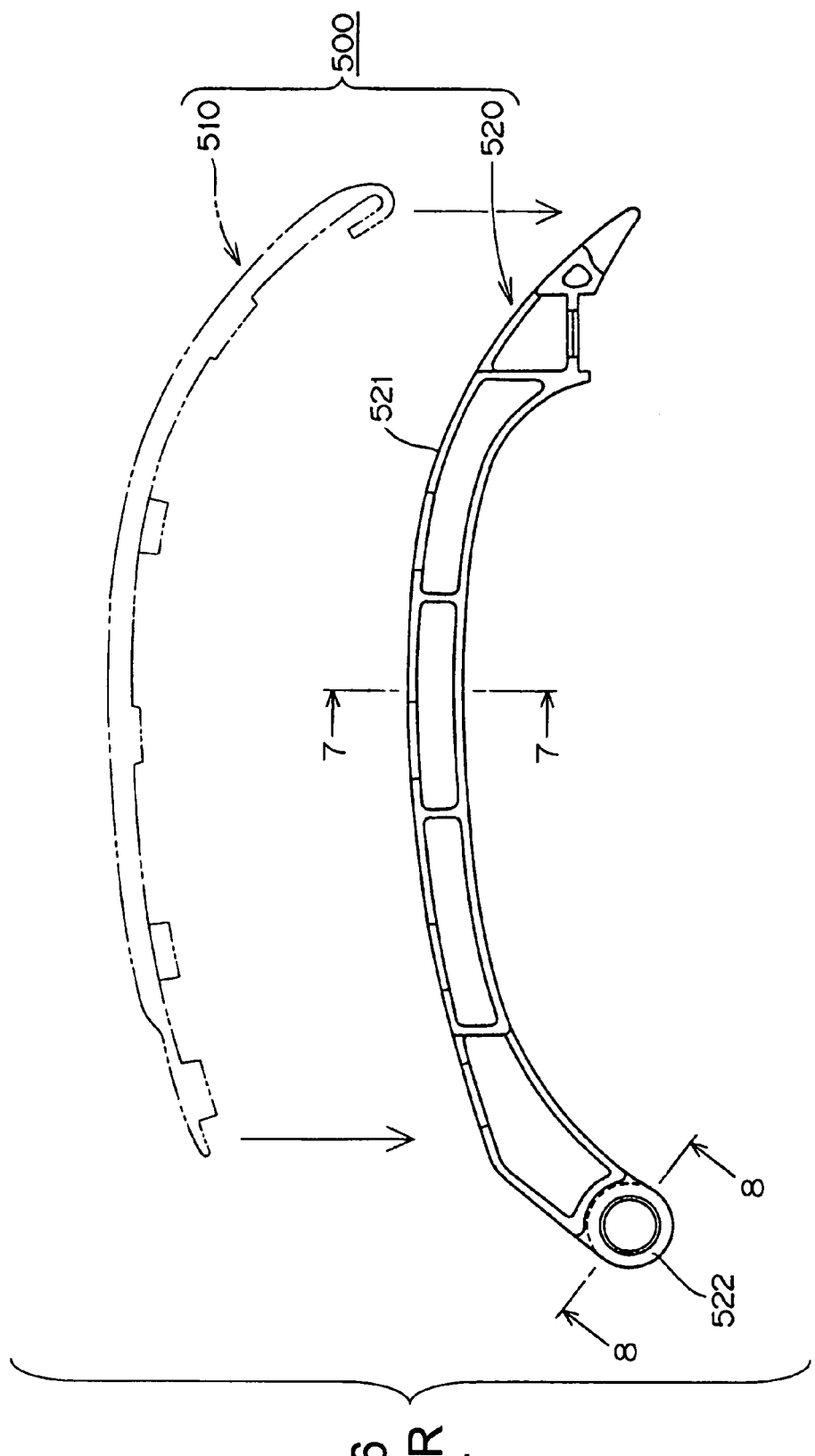
FIG. 6 is an exploded side elevational view of a conventional tensioner lever.

As shown in FIGS. 4 and 5, the base frame 120 is cast in a die comprising parts P1 and P2, which form an I-shaped cavity, and can be separated from each other along the directions indicated by arrows X. The die parts P1 and P2 meet at parting lines PL, one of which meets a corner of the upper inside face of the die cavity and the other of which meets a diagonally opposite corner of the die cavity. Thus the die cavity has a first corner 121a, along which a side edge of the front surface 121 of the base frame is formed, and a second, diagonally opposite corner 121a, along which a side edge of the back surface of the base frame is formed. Both corners 121a extend along the direction of elongation of the die parts, and, when the die parts are brought together, these corners of the cavity coincide with edges of the parting lines at which the die parts meet.

Figure 7:
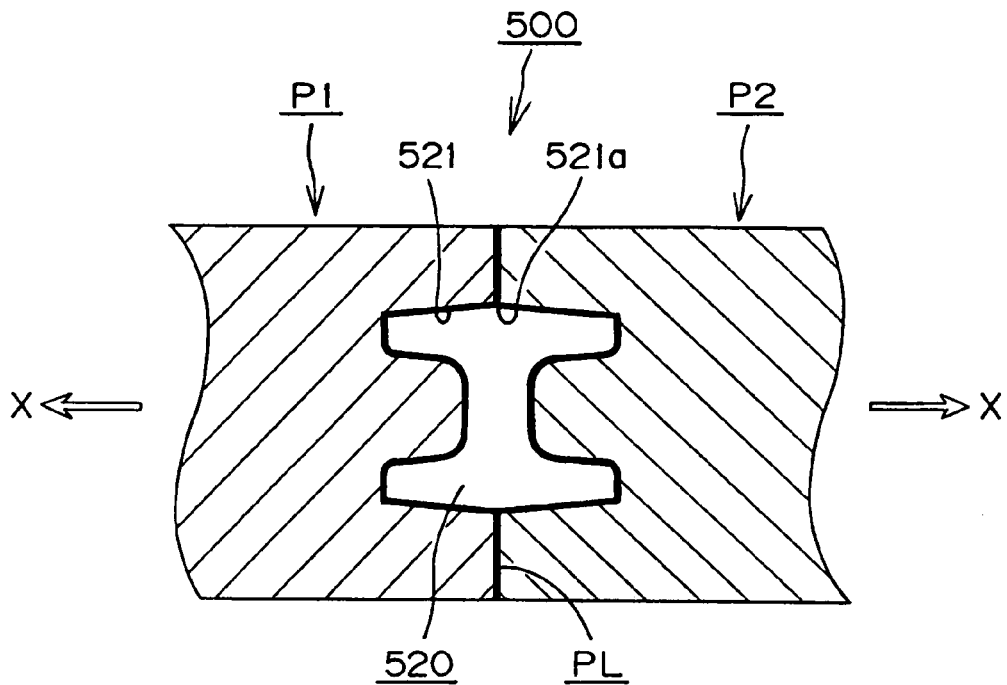
FIG. 7 is a cross-sectional view of the guide of FIG. 6, shown in the die in which it is cast, the section being taken on section plane 7-7 in FIG. 6.

In FIG. 4, the symbol α indicates surfaces that either have no draft at all or a draft having a single pitch. In particular, since the inside face of die part P2 that forms the front surface 121 of the base frame is continuous and straight in cross-sectional planes to which the direction of elongation of the die part is perpendicular, the cross-sectional shape of the front surface 121 is straight, and when the base frame is removed from the die, does not have oppositely pitched drafts requiring an additional machining step, as does the conventional base frame shown in FIG. 7.

Although it is not necessary for the parting line PL adjacent the back surface of the base frame to meet a corner of the die cavity, in the preferred embodiment illustrated in FIG. 4, the parting lines PL are symmetrically arranged at opposite corners of the I-shaped cavity. When the die parts are separated from each other, by relative movement in the directions indicated by arrows X, large portions of the base frame 120 become fully exposed, so that the base frame can be removed easily. As a result, excessive loads on the die parts P1 and P2 are avoided, and the useful life of the die is extended.

As shown in FIG. 5, at the location of the die cavity in which the boss 122 and the pivot hole 122 of the base frame are formed, the parting lines PL outside the boss are located midway between the ends of the boss, and the parting line where the pivot hole is formed is located at one end of the boss. Therefore, as seen in FIG. 5, the inside wall of the pivot hole is formed by a continuous, cylindrical extension of die part P1, which is surrounded by an annular recess forming part of the die cavity. A cylindrical recess in die part P2 receives the extension of part P1, to form a similar annular recess within part P2. The cylindrical recesses are, of course, continuous with recesses in the dies that form the I-shaped part of the base frame and the reinforcing ribs.

When the die parts P1 and P2 are separated from each other by movement in the directions indicated by arrows X, the boss portion and the pivot hole of the base frame are formed.

Figure 8:
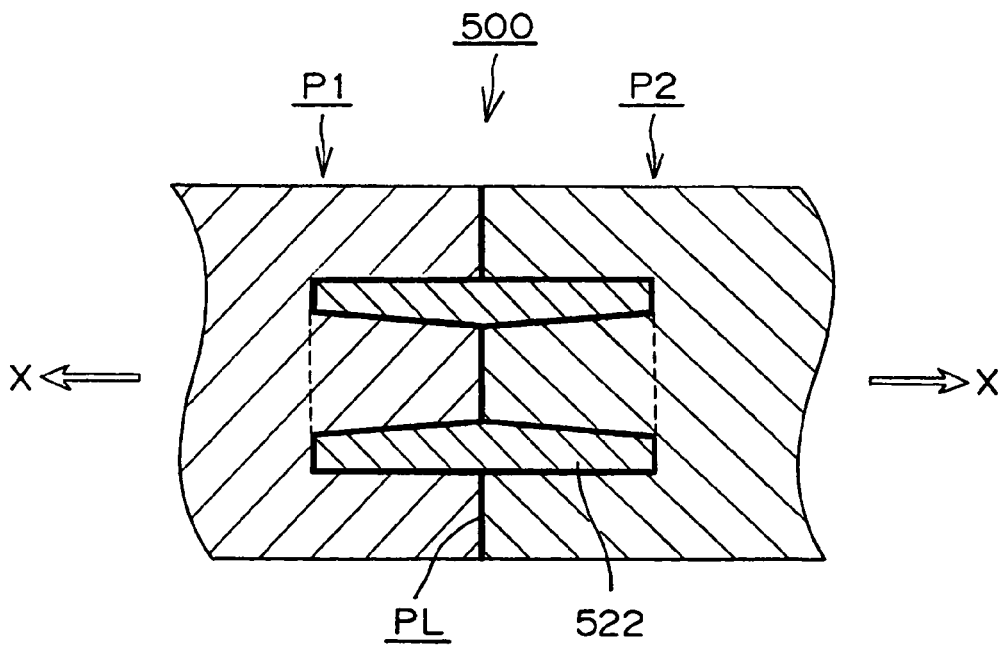
FIG. 8 is a cross-sectional view of the guide of FIG. 6 shown in the die in which it is cast, the section being taken along on section plane 8-8 in FIG. 6.

The extension of die part P1 on which the interior wall of the pivot hole is formed has a continuous outer surface in the form of a surface of revolution. For any two stations along the length of the protruding portion, the diameter of the station closest to the tip is no greater than the diameter of the other of the two stations. Consequently, the extension is either cylindrical, or tapered down gradually, but continuously, toward the tip. Consequently, the interior wall of the pivot hole is either cylindrical, that is, formed without a draft, which is preferred, or tapered continuously from one end to the other. As a result, the two oppositely pitched drafts in the conventional cast pivot hole as shown in FIG. 8 are avoided, and a precision machining step carried out subsequent to casting, becomes unnecessary.

By forming the boss and pivot hole of the base frame in the manner illustrated in FIG. 5, the production cost of the guide can be significantly reduced, while smooth pivoting action can be achieved. Moreover, weight reduction of the base frame 120 can be attained, since it is unnecessary to form the boss with an excess thickness in order to permit it to be bored out in a post-casting machining step, and the risk of failure due to the formation of voids in the boss is reduced significantly.

When the base frame 120 is removed from the die while in a semi-solidified state, the adverse effects of thermal shrinkage are avoided, and the die can be opened smoothly and without the imposition of excessive loads on the die parts.

In summary, in accordance with the invention, an aluminum base frame of a sliding contact guide is die cast in such a way as to avoid oppositely pitched drafts on the shoe-engaging surface of the base frame and also on the interior of the pivoting hole in the case of a pivoted guide. Additional machining steps following casting are avoided, reducing the cost of production. Moreover, with the invention, the weight of the guide can be reduced, the shoe can be securely and stably mounted on the guide, and smooth pivoting motion of the guide S can be achieved without sacrificing strength of the guide.

The invention claimed is:

1. An aluminum base frame which supports a resin shoe in a guide an endless, flexible, traveling transmission medium, the aluminum base frame having a front surface facing in a first direction for supporting engagement with a resin shoe, and a back surface facing in a direction opposite to said first direction, the base frame being die-cast by a method comprising:

assembling a die by bringing together first and second enlongated die parts to form a die cavity;

pouring molten aluminum into the die cavity, thereby casting the aluminum base frame; and removing said die parts from the aluminum base frame;

wherein the first die part has a continuous face against which the front surface of the aluminum base frame is formed, said face being substantially straight in cross-section planes to which the direction of elongation of the die part is perpendicular, thereby avoiding the formation of oppositely pitched drafts on the front surface of the base frame;

wherein the base frame has a pivot hole having a interior wall, in the form of a surface of revolution, for receiving a shaft on which the base frame can be pivoted;

wherein at least one of the die parts includes a protruding portion having a continuous outer surface in the form of a surface of revolution on which the interior wall of the pivot hole is formed and a tip; and wherein, for any two stations along the length of the protruding portion, the diameter of the station closest to the tip is no greater than the diameter of the outer of the two stations, whereby the interior wall of the pivot hole is cast without oppositely pitched drafts.

2. An aluminum base frame which supports a resin shoe for om a guide for an endless, flexible, traveling transmission medium, wherein the base frame has a pivot hole having an interior wall, in the form of a surface of revolution, for receiving a shaft on which the base frame can be pivoted, the method comprising assembling a die by bringing together first and second die parts to form a die cavity;

pouring molten aluminum into the die cavity, thereby casting the aluminum base frame; and removing said die parts from the aluminum base frame;

wherein at least one of the die parts includes a protruding portion having a continuous outer surface in the form of a surface of revolution on which the interior wall of the pivot hole is formed and a tip; and wherein, for any two stations along the length of the protruding portion, the diameter of the station closest to the tip is no greater than the diameter of the other of the two stations, whereby the interior wall of the pivot hole is cast without oppositely pitched drafts.

* * * * *